L. LADINSKI.
CROSS BELT SPACER.
APPLICATION FILED JAN. 15, 1915.

1,144,767.

Patented June 29, 1915.

WITNESSES
Chas. F. Clagett
Bertha M. Allen

INVENTOR
Louis Ladinski
BY
HIS ATTORNEYS

UNITED STATES PATENT OFFICE.

LOUIS LADINSKI, OF NEW YORK, N. Y.

CROSS-BELT SPACER.

1,144,767.

Specification of Letters Patent.

Patented June 29, 1915.

Application filed January 15, 1915. Serial No. 2,324.

*To all whom it may concern:*

Be it known that I, LOUIS LADINSKI, a citizen of the United States of America, residing in the borough of Bronx, city, county, and State of New York, have invented an Improvement in Cross-Belt Spacers, of which the following is a specification.

In many instances, in belting, as is well known, it is necessary to cross a belt, or in other words to cause the same to travel in one direction over the drive pulley, and in the opposite direction around the driven pulley. Where it is necessary to do this, both parts of the belt, at which the same cross, come into contact and rub against one another, thereby not only causing an undue wear in the belt but also unnecessarily wasting the power applied in driving the machine.

The object of my invention is the provision of a simply constructed apparatus for preventing those parts of the cross belt from coming in contact with one another, where the same cross, thereby preventing undue wear in the belt, and also in view of the comparatively small friction between one part of the belt and the contact device employed to separate the same from the other part of the belt, there is, in the employment of my belt spacer, a material saving in the power employed to drive the machine in which the said belt spacer is used.

The construction of my improved cross belt spacer will be hereinafter more particularly described.

Figure 1:
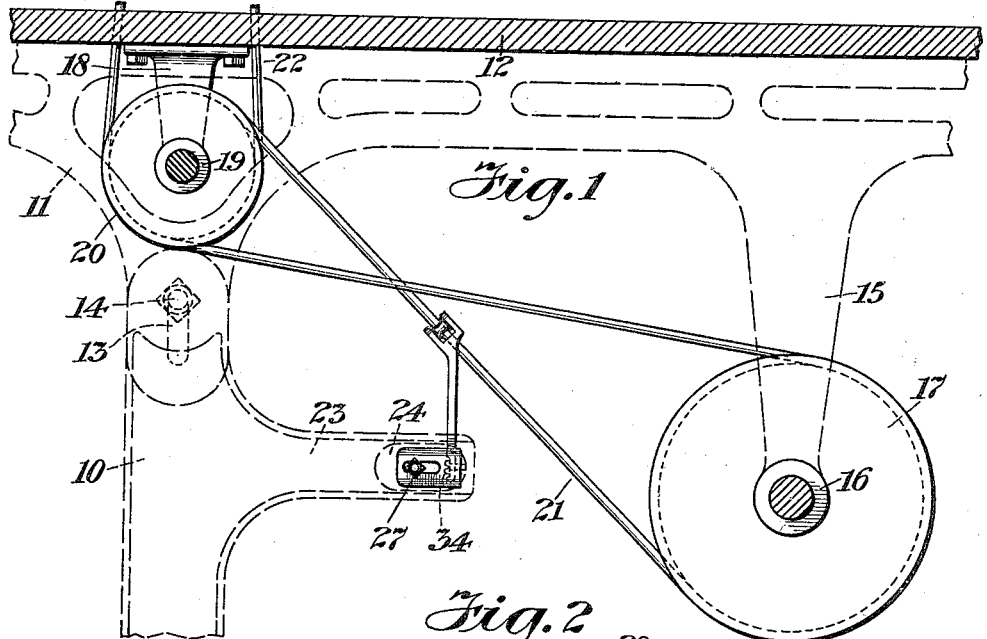
Figure 2:
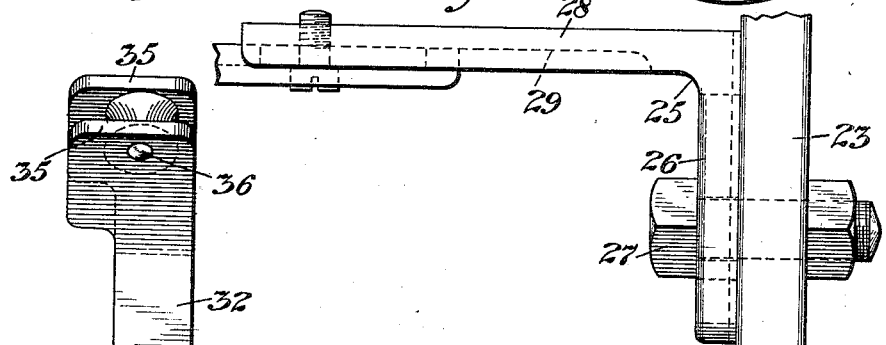
Figure 3:
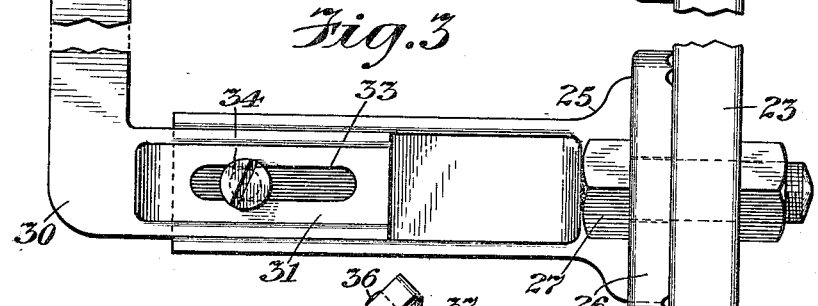
Figure 4:
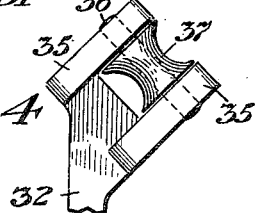

In the drawing, Figure 1 is an elevation of an apparatus fitted with my improved cross belt spacer. Fig. 2 is a plan of the support and adjustable bracket connected therewith. Fig. 3 is a side elevation of these parts, including the adjustable arm carrying the belt contact member, and Fig. 4 is an elevation of the offset end of the arm in which I employ a pulley to contact with one member of the belt.

In the drawing, I have illustrated my invention as applied to a sewing machine, although, as will be understood, its application is not so limited, inasmuch as it may be employed, when properly constructed, in any place where it is necessary to cross a belt.

In the drawing, 10 indicates a support suitably connected to the base of a machine. 11 indicates the frame upon which the top 12 or table of the machine is connected.

In the support 10, as well as in the frame 11, there are slots, indicated at 13, through which a bolt 14 is passed in order that these parts may be adjusted to position and suitably connected together.

Depending from the frame 11 is a hanger 15, at the extremity of which there is a bearing 16, in which the shaft of a pulley 17 is journaled. 18 also indicates a hanger secured to the top 12 and depending therefrom, and at its extremity provided with a bearing 19 in which the shaft of a pulley 20 is journaled. As indicated, the pulley 17 is a drive pulley, and the pulley 20 a driven pulley. This driven pulley 20 is also adapted to receive a belt 22, employed to drive the machine, as will be understood.

21 indicates the belt employed to drive the pulley 20 from the pulley 17, and, as shown, this belt is crossed.

In a suitable position on the support 10, there is provided a projection 23. Adjacent its extremity on one side thereof, there is a recess 24 in this projection 23. I also employ a bracket 25, the arms 26 and 28 of which are at right angles to each other. The arm 26 is adapted to fit and slide within the recess 24, and may be adjusted to position therein toward and away from the drive pulley 17, and fixed in such adjusted position by means of a bolt 27, which is passed through suitable slots provided for this purpose in either the arm 26 or the projection 23, or in both of these members. One face of the arm 28 of the bracket 25 is also recessed, as is indicated at 29, in order to receive the arm 31 of the member 30. This is adjustable to position therein and when so adjusted may be fixed in place by means of a screw 34, which passes through the slot 33 in the arm 31 and turned down into a tapped opening provided in the arm 28. The arm 32 of the member 30 is also preferably at right angles to the arm 31 thereof, and at its free end is provided with lugs 35. These are offset or placed at an angle to the arm and are preferably parallel to one end and provided with a pin or arbor 36, upon which, between the lugs, is mounted a pulley 37.

From the foregoing description, it will be apparent that the bracket 25 may be adjusted toward and away from the drive pulley and fixed in place by the bolt 27, and that the member 30 may be adjusted toward and away from one part of the belt 21, and by the set screw 34 fixed in the necessary position to maintain that portion of the belt with which the pulley 37 contacts, away from the other portion of the belt at those portions of the belt at which the same cross. This, as hereinbefore stated, and as will be readily understood, prevents the wear which would be otherwise occasioned where there is rubbing of the parts of the belt, in crossing one another, and also due to the relatively small amount of friction between the pulley 37 and that portion of the belt which contacts with the same, there is a material saving in the power necessary to drive the machine.

I claim as my invention—

1. A cross belt spacer comprising a support, a bracket adjustable to position in the said support, an arm adjustable to position in the said bracket and at right angles to the direction of adjustability of the said bracket, and means at the free end of the said arm for spacing parts of a cross belt as the same pass each other.

2. A cross belt spacer comprising a support, a bracket adjustable to position in the said support, an arm adjustable to position in the said bracket and at right angles to the direction of adjustability of the said bracket, lugs in an offset position at the free end of the said arm, and a pulley having a concave surface mounted to turn freely between the said lugs and to engage one part of a round belt to prevent the same from coming into contact with the other part thereof adjacent the point where said parts of the round belt cross each other.

Signed by me this 12th day of January, 1915.

LOUIS LADINSKI.

Witnesses:
B. M. ALLEN,
J. B. LE BLANC.

Copies of this patent may be obtained for five cents each, by addressing the "Commissioner of Patents, Washington, D. C."